United States Patent [19]

Morozumi et al.

[11] 4,242,679

[45] Dec. 30, 1980

[54] LIQUID CRYSTAL DISPLAY MECHANISM

[75] Inventors: Shinji Morozumi; Yoshio Yamazaki; Tatsushi Asakawa; Yasunori Nakazaki, all of Suwa, Japan

[73] Assignee: Kabushiki Kaisha Suwa Seikosha, Tokyo, Japan

[21] Appl. No.: 941,881

[22] Filed: Sep. 13, 1978

[30] Foreign Application Priority Data

Sep. 13, 1977 [JP] Japan ................ 52/110763

[51] Int. Cl.³ .............................. G02F 1/13
[52] U.S. Cl. ......................... 340/765; 340/813; 350/332
[58] Field of Search ............ 340/765, 784, 713, 718, 340/719, 813; 350/331, 332

[56] References Cited

U.S. PATENT DOCUMENTS

| | | | |
|---|---|---|---|
| 3,577,137 | 5/1971 | Brennan | 340/713 X |
| 3,776,615 | 12/1973 | Tsukamoto et al. | 340/784 |
| 3,907,405 | 9/1975 | Fukai et al. | 340/784 X |
| 4,045,791 | 8/1977 | Fukai et al. | 340/784 X |
| 4,057,325 | 11/1977 | Kondo | 340/784 |

*Primary Examiner*—David L. Trafton
*Attorney, Agent, or Firm*—Blum, Kaplan, Friedman, Silberman & Beran

[57] ABSTRACT

A liquid crystal display driving circuit arrangement that is formed entirely of elements that can be monolithically integrated in a circuit chip and that adjusts the effective voltage of the drive signals applied to the liquid crystal display cells in response to variations in external conditions is provided. A sensing circuit is adapted to produce a signal representative of a change in an external condition and in response thereto produce a sensing signal representative thereof. A pulse control circuit is adapted to detect the condition signal and in response thereto produce a control signal representative of a variation in effective voltage to be applied to the display cells. A driving circuit is coupled to a liquid crystal display for applying drive signals produced by display control circuit having a variable effective voltage. The driving circuit is adapted to vary the effective voltage of the drive signals applied to the liquid crystal digital display cells by an amount determined by the control signal applied thereto.

14 Claims, 14 Drawing Figures

FIG.1
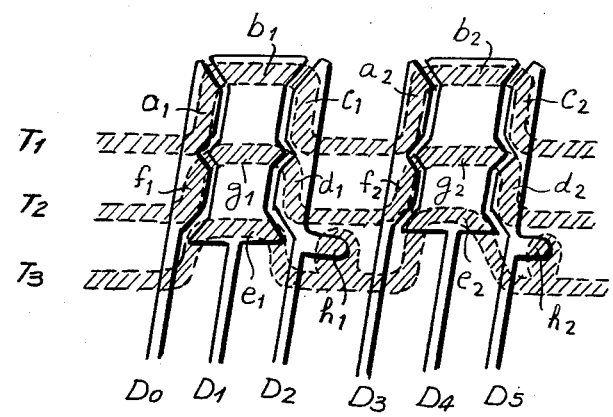
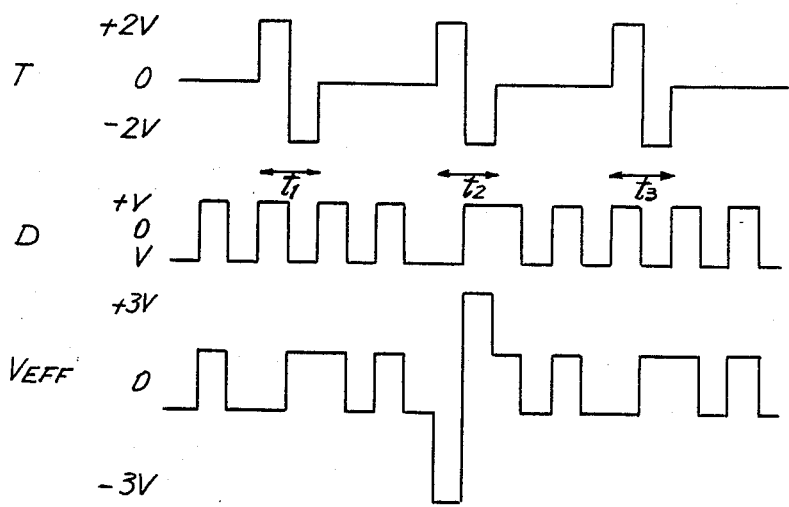
FIG.2

LIQUID CRYSTAL DISPLAY MECHANISM

BACKGROUND OF THE INVENTION

This invention is directed to a fully integrated liquid crystal display arrangement having no external adjustment elements that compensate for changes in supply voltage, ambient temperature and/or environment and, in particular, to a liquid crystal display driving circuit that varies the effective voltage of drive signals applied to a dynamically driven liquid crystal display cell in response to detecting changes in external conditions such as the temperature, environment and supply voltage.

Because of the minimal power consumption of liquid crystal display elements, a desirable characteristic in miniaturized electronic instruments, liquid crystal displays are increasingly being used instead of LED displays in electronic wristwatches, electronic table calculators and the like. It is noted, however, that when compared with light emitting elements such as LEDs, liquid crystal display elements do not have switching speeds and temperature characteristics that are as suitable as LEDs. These two deficiencies, slow transient speed and unstable temperature characteristics, render it more difficult to dynamically drive liquid crystal display cells. In particular, the threshold voltage for driving a liquid crystal display cell changes in response to temperature changes and if the temperature drops to a sufficiently low level, the liquid crystal display cells cannot be driven. Accordingly, a liquid crystal display driving arrangement that is less sensitive to changes in external conditions, such as supply voltage, temperature and environment, is desired.

SUMMARY OF THE INVENTION

Generally speaking, in accordance with the instant invention, a liquid crystal display mechanism that adjusts the effective voltage of drive signals applied to a liquid crystal display cell, in response to detecting a change in an external condition, is provided. A driving circuit is adapted to receive display control signals and, in response thereto, apply drive signals having an effective voltage to a plurality of liquid crystal display cells to effect driving thereof. A sensing circuit is adapted to sense a change in a predetermined output condition and, in response thereto, produce a sensing signal. A control circuit is disposed intermediate the sensing circuit and the driving circuit and, in response to the sensing signal being applied thereto, produce a control signal for varying the effective voltage of the drive signal applied to the liquid crystal display cells in accordance with the change in the output condition.

Accordingly, it is an object of this invention to provide a liquid crystal display driving circuit that is without any external compensating elements and provides stable driving of liquid crystal display cells in response to environmental changes.

A further object of the instant invention is to provide a liquid crystal display driving circuit that permits liquid crystal display cells to be dynamically driven in a stable manner notwithstanding changes in environment, supply voltage and/or ambient temperature.

Still a further object of the instant invention is to provide a fully integrated, miniaturized, highly reliable and inexpensive liquid crystal display cell dynamic driving circuit that automatically compensates for changes in environmental conditions.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a plan view of an electrode pattern of a liquid crystal ⅓ dynamic driving circuit arrangement;

FIG. 2 is a wave diagram illustrating the manner in which the ⅓ dynamic driving circuit arrangement, depicted in FIG. 1, operates;

FIG. 7a is a wave diagram of the signals used to produce the data signal depicted in FIG. 5;

FIG. 7b is a circuit for producing the data signals by using the signals illustrated in FIG. 7a;

DETAILED DESCRIPTION OF THE PREFERRED EMBODIMENTS

Figure 3:
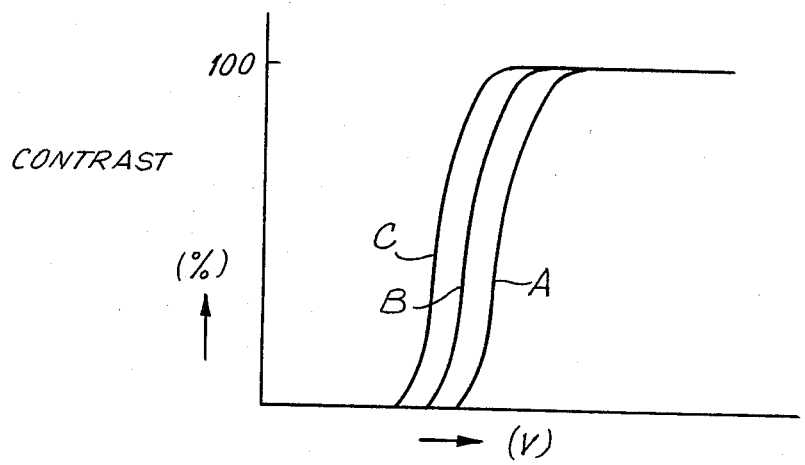
FIG. 3 is a graphical comparison of the change in contrast voltage characteristics of a liquid crystal display cell in response to changes in ambient temperature.

Reference is first made to FIG. 1 wherein a liquid crystal digital display electrode pattern that is particularly suited to be driven in a ⅓ dynamic driving mode is depicted. Three timing electrodes are adapted to receive timing signals $T_1$ through $T_3$ and are disposed in overlapping relationship with respect to the data electrodes adapted to receive data signals $D_0$ through $D_N$, in order to define conventional seven-segment display digits having a decimal point. For example, the timing signal $T_1$ is applied to an electrode that overlaps the electrode receiving the data signal $D_0$ to define display segment $a_1$. Similarly, the same electrode that receives the timing signal $T_1$ is disposed in overlapping relationship with respect to the electrode receiving data signal $D_3$ in order to define display segment $a_2$ in a second display digit. When a sufficient voltage difference is generated between the overlapping electrodes, the display segments are turned ON and, hence, rendered visible. Alternatively, when the potential difference between overlapping electrodes is insufficient to turn ON the particular display segment, the display segment remains OFF and, hence, not visible.

A specific example of the timing signals T and data signals D and the manner in which same define an energizing voltage $V_{EFF}$ is illustrated in FIG. 2. When the effective voltage across overlapping electrodes is $\pm 3$ V, the liquid crystal display segment is turned ON. However, when the effective voltage between overlapping electrodes is only $\pm V$, the display segment remains OFF. Thus, for the periods $t_1$ and $t_3$, illustrated in FIG. 2, the display segment would be turned OFF and during the interval $t_2$, the particular display segment, defined by electrodes receiving timing signals T and data signals D, would be turned ON. As illustrated in FIG. 1, by utilizing a ⅓ dynamic driving mode, only twenty-seven electrode leads would be necessary to form a dynamically driven eight digit display. In contrast thereto, an eight digit statically driven liquid crystal display would require sixty-five electrodes (sixty-four segment electrodes plus one additional decimal point) to obtain the same result obtained by a dynamically driven liquid crystal display having considerably fewer electrodes. This reduction in the number of electrodes renders the liquid crystal display more reliable, less expensive to manufacture and requires less space than a statically driven liquid crystal digital display.

It is noted, however, that in dynamically driven liquid crystal displays of the type detailed above, the ratio R of the effective OFF voltage, OFF-$V_{RMS}$, to the effective ON voltage, ON-$V_{RMS}$, when the liquid crystal display is turned ON and OFF is decreased:

$$R = (OFF - V_{RMS})/(ON - V_{RMS})$$

It is, therefore, apparent that the performance of a dynamically driven liquid crystal display, of the type detailed above, deteriorates in response to changes in its threshold voltage, which changes result from changes in ambient temperature, a lowering of the driving voltages applied to the dynamically driven circuit as a result of the DC battery becoming dissipated or as a result of other environmental changes. Dynamically driven liquid crystal display arrangements are, therefore, limited to operating in an optimum environment in which changes in the aforenoted conditions are avoided, thereby rendering same less than completely satisfactory.

Additionally, there are two basic driving arrangements utilized to effect the control of nematic liquid crystals. A first method is referred to as a DSM driving method wherein nematic liquid crystals having a negative dielectric anisotropy are utilized. The other well known method is referred to as FEM display wherein the dielectric anisotropy of the nematic liquid crystals is utilized in combination with polarizers in order to control the use thereof. Electronic table calculators and digital wristwatches having liquid crystal digital displays utilizing a FEM display method have been provided. One advantage of these liquid crystal displays is that they admit of a very small current consumption. It is noted, however, that such FEM display driven liquid crystal displays have been arranged in a static driving pattern. Thus, the advantages which inure to dynamically driven liquid crystal digital displays, of the type noted above, are not realized by statically driven liquid crystal digital displays driven by the FEM method. In particular, the larger the number of display digits, the larger the decrease in the number of electrodes and resultant increase in reliability, reduced cost and miniaturization, as discussed above. Nevertheless, because of the limited duty cycle (½ to ⅓), dynamic driving of liquid crystal display arrangements utilizing the FEM method have limited the use of same.

It is noted that three factors that greatly influence the dynamic driving characteristics of liquid crystal display segments are sharpness, visual dependence, and temperature dependence. With respect to sharpness, it is preferred that the liquid crystal display segments have a sharply rising voltage contrast curve. The optimum sharpness is, thus, obtained when the threshold voltage and the saturation voltage of the liquid crystal display segments are the same.

With respect to visual dependence, the optimum condition requires that the voltage-contrast characteristic remain unchanged no matter what direction the display segment is viewed from. The shape of the liquid crystal molecules, utilized in the display cell, have a considerable influence upon the visual dependence of the liquid crystal display cell.

With respect to temperature dependence, the viscosity of the display cell and the voltage-contrast characteristic should not change appreciably in response to changes in the ambient temperature. Temperature dependence and, in particular, the changes in the threshold voltage and saturation voltage of a liquid crystal display cell, in response to changes in ambient temperature are deemed to be the most considerable barrier in developing dynamically driven liquid crystal displays. The amount of fluctuation in the voltage-contrast characteristic of a liquid crystal display cell, in response to changes in temperature when a FEM display method is utilized, is illustrated in FIG. 3. The curves A, B and C represent voltage-contrast characteristics of liquid crystal display cells when operated at different ambient temperatures. Thus, at the lowest temperature, the curve A demonstrates that the threshold voltage of the liquid crystal display cell will shift to the highest level. Similarly, curve C demonstrates that the threshold voltage level will drop in response to the highest temperature level. Taking these conditions into account, the instant invention is particularly characterized by maintaining the margin between the allowable operating voltages resulting from the difference between the saturation voltage and threshold voltage of the liquid crystal display cell constant when the liquid crystal display cells are dynamically driven, by changing the effective value of the driving voltage applied to the circuit in response to changes in temperature.

Figure 4:
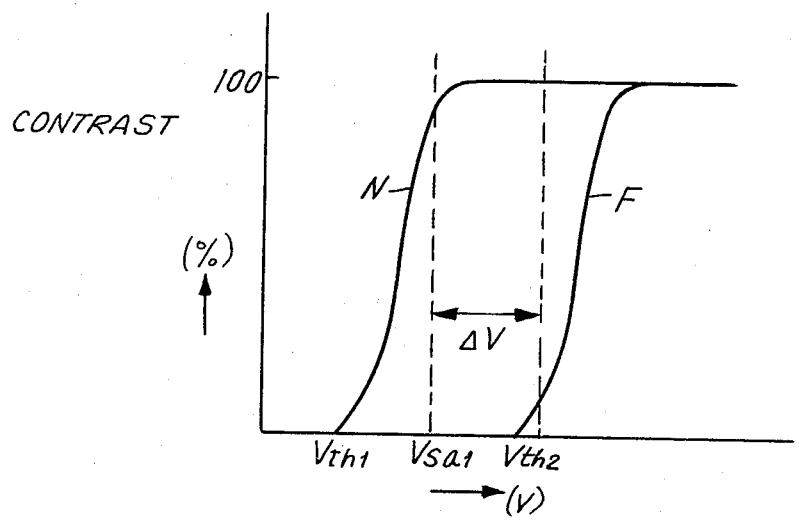
FIG. 4 is a wave diagram illustrating the variations in the ON-OFF characteristics of a liquid crystal display cell.

As is illustrated in FIG. 4, the voltage margin is defined as the difference $\Delta V$ between the ON voltage-contrast characteristic and the OFF voltage-contrast characteristic. The ON wave form is illustrated by the curve N and the OFF wave form is illustrated by the curve F in FIG. 4. Moreover, the voltage margin $\Delta V$ is defined as the difference between the voltage $V_{sa1}$ which is the point at which sufficient contrast of the curve N is provided and the value $V_{th2}$ of the curve F and defines the permissible operating voltage margin. By assuring that the curves N and F are shifted in parallel, in response to changes in temperature, the instant invention assures that the actual margin of the allowable operating voltage is hardly varied in response to changes in temperature. This result is obtained by varying the operating voltage in response to changes in temperature. As is detailed below, the effective voltage utilized to drive the display is varied in response to changes in external conditions without changing the ratio R.

Figure 5:
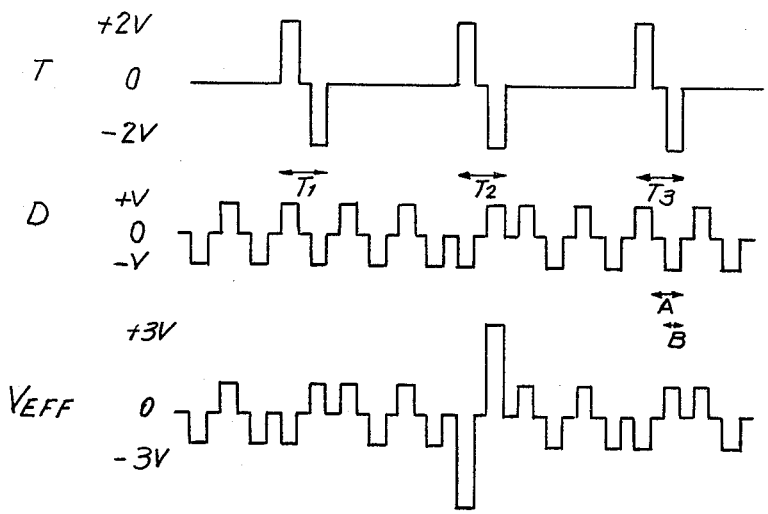
FIG. 5 is a wave diagram illustrating the variations of the duty cycle of a drive signal in accordance with the dynamic driving circuit arrangement of the instant invention.

The wave forms, illustrated in FIG. 5, demonstrate the manner in which liquid crystal display cells are dynamically driven by one embodiment of the instant invention. Both the timing signal T and the data signal D are referenced to a zero potential. Moreover, the peak-to-peak voltages of the timing signals and data signals remain the same as the peak-to-peak voltages illustrated in FIG. 2, and thereby require an effective voltage $V_{eff}$ of ±3 V in order to turn ON the display segments. It is noted, however, that in the wave forms, illustrated in FIG. 2, the ratio of the values B/A of the timing and data signals was one (1). The ratio of B/A of the timing and data signals, illustrated in FIG. 5, is within the range of 0.5 to 1.0 in order to compensate for changes or shifts in the threshold value of the liquid crystal display cells as a result of changes in external conditions. As is demonstrated in greater detail below, by maintaining the amplitude of the driving signals constant and by varying the pulse width of the drive signals in response to changes in ambient conditions the effective voltage of the drive signal is varied to compensate for the change in environmental condition on the operating conditions of the liquid crystal display cells.

Figure 6:
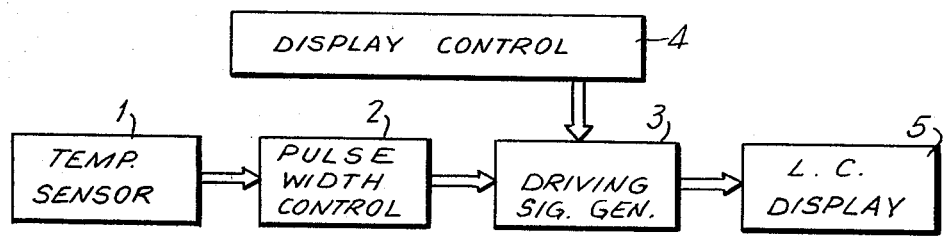
FIG. 6 is a block circuit diagram of a liquid crystal display driving arrangement constructed in accordance with the preferred embodiment of the instant invention.

FIG. 6 illustrates a block circuit diagram of a display driving circuit for producing driving wave forms of the type illustrated in FIG. 5. In particular, a temperature sensing circuit detects a change in temperature and applies a sensing signal representative thereof to a pulse width control circuit 2. The pulse width control circuit, in response to the sensing signal, produces a control signal. A display control circuit 4 applies the display driving signals to driving signal generator 3. Driving signal generator 3 in response to the driving signals produced by display control circuit 4 and the pulse width control signals produced by pulse width control circuit 2, apply driving signals to the liquid crystal display 5 having a reduced ratio B/A and a constant peak-to-peak amplitude of the type illustrated in FIG. 5.

Figures 7A, 7B:
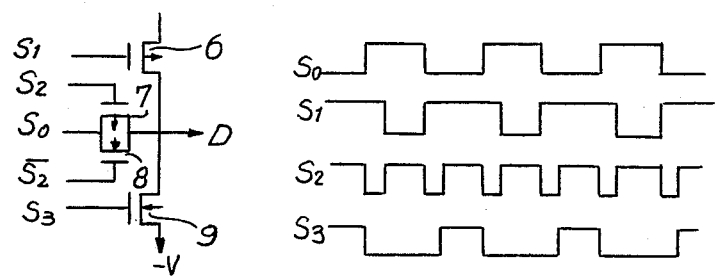

The driving signal generator 3 includes a gating circuit for receiving signals $S_1$, $S_2$, $S_3$ and $S_0$ and thereby producing data signal D, illustrated in FIG. 7a. The signals illustrated in FIG. 7a are applied to the gating circuit, illustrated in FIG. 7b, which circuit is comprised of complementary coupled P-channel and N-channel transistors 7 and 8 coupled to define a transmission gate and complementary coupled P-channel and N-channel transistors 6 and 9 having their drain electrodes coupled to define the output terminal for producing the data signal D.

Figure 8:
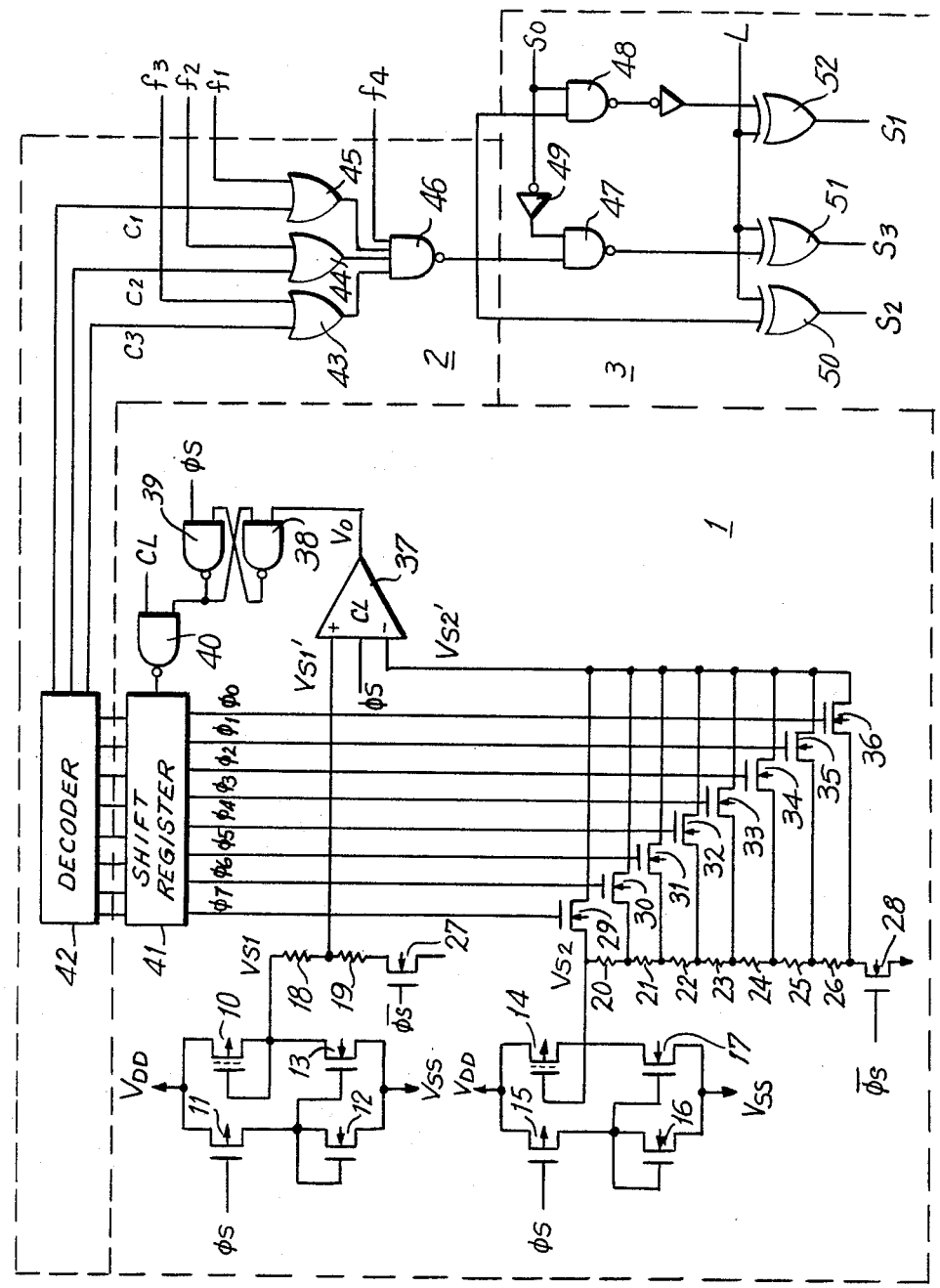
FIG. 8 is a circuit diagram of a dynamic driving compensating circuit, constructed in accordance with the preferred embodiment of the instant invention.

Referring now to FIG. 8, a preferred embodiment of the temperature sensing circuit 1, pulse width control circuit 2 and a portion of the driving signal generator 3, described above, is depicted in detail. Turning first to the temperature sensing circuit 1, a standard voltage source is comprised of a first standard voltage circuit, including MOS transistors 10 through 13, and a second standard voltage circuit, including transistors 14 through 17. MOS transistor 10 in the first standard voltage circuit and MOS transistor 14 in the second standard voltage circuit have different threshold values than the remaining transistors in the respective first and second standard voltage circuits. The different threshold voltage is obtained by a conventional method such as ion implantation or the like. Accordingly, a first standard voltage $V_{S1}$, produced by the first circuit, is equal to the difference between the threshold values of the MOS transistors 10 and 11 in the first circuit. If the conductance characteristic of the transistor 10 is the same as the conductance characteristic of the MOS transistor 11, the first output voltage $V_{S1}$ of the first circuit will not vary in response to changes in the supply voltage and/or in the ambient temperature.

In the second standard voltage circuit, the standard voltage $V_{S2}$ produced thereby is varied when the ratio of the conductance of the transistor 14 to the conductance of the transistor 15 is changed. Thus, the first standard voltage circuit is characterized by the standard voltage $V_{S1}$ produced thereby not being varied in response to changes in temperature whereas the second standard voltage $V_{S2}$, produced by the second standard voltage circuit, is varied in response to changes in temperature.

As is explained in greater detail below, the standard voltages $V_{S1}$ and $V_{S2}$ are respectively applied through resistive divider networks and applied as respective input signals $V'_{S1}$ and $V'_{S2}$ to C-MOS operational amplifier 37, which functions as a comparator circuit and, hence, compares the potential of the standard voltages applied to the respective input terminals thereof.

The standard voltage $V_{S1}$, produced by the first circuit, is divided by resistors 18 and 19 and is further controlled by the application of a sampling signal $\phi_s$ to MOS transistor 27 and transistor 11, to thereby effect a periodic application of divided standard voltage $V'_{S1}$ to the comparator 37. The variable standard voltage $V_{S2}$, produced by the second circuit, is divided by a resistive network comprised of resistors 20 through 26 in response to sampling signal $\phi_s$ being applied to the gate electrode switching transistor 28 and the gate electrode of transistor 15. Thus, in response to certain of the resistors 20 through 26 being selected by control gating MOS transistors 29 through 36 coupled thereto, a variable divided standard voltage $V'_{S2}$ is supplied to the negative terminal of the operational amplifier 37. The control gating transistors 29 through 36 are selectively opened and closed by the shift register 41 in order to select the resistors 20 through 26, in the following manner. Sampling signal $\phi_s$ is applied to a set-reset circuit defined by NAND gates 39 and 38, which circuit also receives as a reset input the output $V_0$ of the operational amplifier 37. A clock signal CL is therefore gated by NAND gate 40 to the shift register 41 until the set-reset circuit is reset by the output $V_0$ of the comparator 37. Thereafter, the shift register 41 stops applying gating signals $\phi_0$ through $\phi_7$ to the transistors 29 through 26, respectively. Specifically, as the control gating transistors 29 through 36 are opened, in sequence, the amplitude of $V_{S2}$ is successively decreased until the output $V_0$ of the comparator is inverted, thereby inhibiting the input of the clock signal CL to the shift register 41. Once the clock signal can no longer be applied to the shift register, the shift register will stop opening the gates, and thereby prevent any further signals $\phi_0$ through $\phi_7$ from being produced by the shift register 41.

The shift register 41 is, thus, coupled to the decoder circuit 42, which decoder detects which signals $\phi_0$ through $\phi_7$ have been selected. Thus, the signals $\phi_0$ through $\phi_7$ selected are applied to the decoder 42 and thereby select the signals $C_1$ through $C_3$ responsible for determining the pulse width or duty cycle of the drive signals to be applied to the liquid crystal display. Signals $C_1$, $C_2$ and $C_3$ are respectively applied as first inputs to OR gates 45, 44 and 43. Signals $F_1$, $F_2$, $F_3$ and $F_4$, respectively having frequencies that are sixteen, eight, four and two times the frequency of $S_0$, are applied as the second inputs of OR gates 45, 44 and 43, respectively, and as a fourth input of NAND gate 46. The signals $C_3$, $C_2$, $C_1$, $f_1$, $f_2$, $f_3$ and $f_4$ determine the duty cycle or pulse width of the driving signals to be applied to the liquid crystal display.

Signal $S_0$ is then applied to a first input of NAND gate 48 and through inverter 49 to a first input of NAND gate 47. The pulse width control signal, produced at the output of NAND gate 46, is applied as a second input to NAND gate 48 and NAND gate 47 and, additionally, is applied as a second input to EXCLUSIVE OR gate 50. The outputs of NAND gates 47 and 48 are applied as second inputs to EXCLUSIVE OR gates 50 and 51, with each of the EXCLUSIVE OR gates 50 through 52 receiving as a first input the signal L which detects the turning ON or OFF of the liquid crystal display segment when the sample pulse $\phi_s$ is applied to the circuit.

Thus, the temperature sensing circuit 1 is controlled by sampling signal $\phi_s$. When it is desired to consume a minimum of power, the temperature adjustment can be almost instantaneously detected during a predetermined interval. For example, a sampling signal $\phi_s$, having a duration of 1 ms, can be applied once each minute in order to effect a temperature sensing operation. This type of sampling would be particularly effective since a current of about 10 uA is dissipated by the voltage source circuits, resistive network and operational amplifier comprising the temperature sensing circuit. Thus, the current dissipation required to effect temperature sensing can be reduced to an insignificant level by effectively utilizing the sampling signal $\phi_s$. Moreover, as detailed in the above description, during the interval $\phi_s$ that temperature sensing is effected, the signals $\phi_0$ through $\phi_7$ are succesively selected until the clock signal CL is inhibited from being applied to the shift register, thereby memorizing the amount of temperature compensation in the shift register until the next application of a sample signal to the shift register. Thus, the signals produced by the decoder 42 will be the same during each interval between sample pulses applied to the temperature sensing circuit 1.

Figure 9:
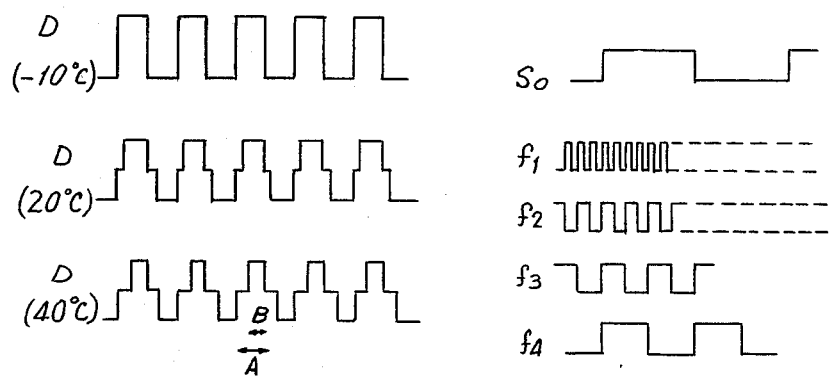
FIG. 9 is a comparative wave diagram of the differences in drive signals produced by the compensating circuit depicted in FIG. 8, in response to changes in ambient temperature.
Figure 10:
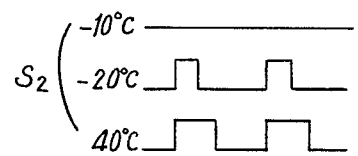
FIG. 10 is a wave diagram illustrating the signals utilized to effect operation of the circuit depicted in FIG. 8.

The manner in which driving signals are varied in response to changes in temperature by the temperature sensing circuit, described above, is depicted in FIG. 9. It is noted that the duty cycle B/A of the pulses is substantially reduced since the threshold voltage of the liquid crystal display cells is reduced in proportion to the increase in the temperature. FIG. 10 illustrates the difference in the signals $S_2$, produced as a result of changes in temperature, with signals $S_0$ and $f_1$ through $f_4$ also being illustrated.

Thus, the embodiment of the instant invention described above is particularly characterized by maintaining the peak-to-peak effective voltage utilized to energize each display segment constant and varying the duty cycle or pulse width of the drive signal applied across the respective overlapping electrodes defining the liquid crystal display segments. To this end, the instant invention contemplates distinct methods of converting the duty cycle of the effective voltage applied across overlapping electrodes, without varying the operating characteristic of the display cell. For example, if the driving signal is not a rectangular wave form, one out of every several drive pulses, having the same duty cycle, can be eliminated. However, in this case, the elimination rate must be varied in order to compensate for shifts in temperature. The instant invention also contemplates a method wherein the effective value of the voltage between overlapping electrodes, defining a display segment, is controlled by including a high frequency component in the driving signal. Each of these methods advantageously permits the operation of the liquid crystal display cell to be compensated in response to changes in external conditions, a feature which is particularly desirable in miniaturized electronic instruments such as electronic wristwatches, table calculators and the like.

Figure 11:
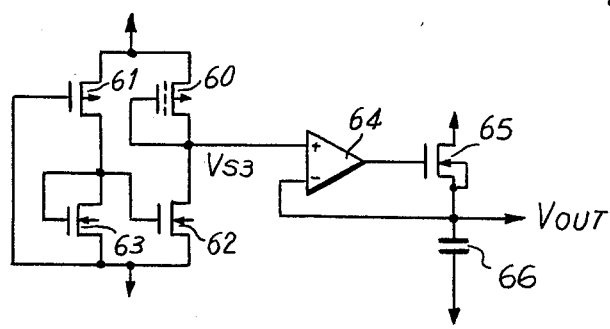
FIG. 11 is a circuit diagram of a driving control circuit that adjusts the amplitude display drive signals in response to a change in temperature.

Reference is next made to FIG. 11, wherein a display driving circuit that permits the amplitude of the effective voltage to be selectively varied in response to shifts in the threshold voltage resulting from changes in ambient temperature, is depicted. Specifically, MOS transistors 60 through 63 define a standard voltage generating circuit, of the type illustrated in FIG. 8 and described in detail above. The standard voltage $V_{S3}$ is provided with a variable temperature characteristic in the same manner as the output $V_{S2}$ in the second circuit, illustrated in FIG. 8. By utilizing this type of approach, the output voltage $V_{OUT}$ is directly proportional to the changes in the standard voltage $V_{S3}$ and thereby permits a stable driving of the liquid crystal display cells.

Figure 12:
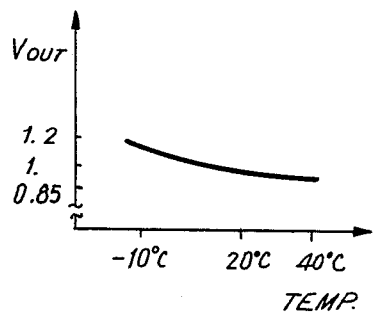
FIG. 12 is a graphical illustration of the voltage-temperature characteristic of the driving control circuit depicted in FIG. 11.

The reduction in the output voltage $V_{OUT}$, as a result of an increase in temperature by the temperature sensing circuit, illustrated in FIG. 11, is illustrated in FIG. 12. It is noted that the output voltage $V_{OUT}$ is increased on the order of 10% to 21% on the low temperature side and decreased 10% to 20% on the high temperature side. When a temperature sensing circuit, of the type illustrated in FIG. 11, it utilized, unlike the embodiment depicted above, the temperature changes are being constantly monitored instead of sampled in the manner discussed above. It is noted, however, that discrete sampling of changes in temperature, in the manner illustrated in FIG. 8, can be utilized in the temperature sensing circuit depicted in FIG. 11. Similarly, in the temperature sensing circuit, illustrated in FIG. 8, continuous detection and compensation, of the type utilized in the temperature sensing circuit depicted in FIG. 11, can be utilized, although same would increase the current consumption thereof. Both embodiments of the invention, however, are characterized by a control of even the booster circuit when distinct level voltages are obtained from a single battery and are required to be elevated before they are applied to the liquid crystal display driving circuit.

It is further noted that the effective voltage in a liquid crystal display driving circuit varies as a result of environmental changes, resulting in deterioration of the performance of the liquid crystal display. Such deterioration particularly occurs when a battery is dry, thereby compounding the deterioration caused by other environmental factors. Stated otherwise, the effective driving voltage applied to the liquid crystal display segment is reduced, not only as a result of the decrease in the voltage delivered by the battery that occurs at low temperatures. The instant invention, therefore, permits the effective driving voltage to be compensated in response to changes in the voltage delivered by the battery. In the first embodiment, the decrease in the voltage delivered by the battery is detected and, in response thereto, assures that no loss in the peak-to-peak value of the effective voltage occurs. In this embodiment, the pulse width, or duty cycle, of the drive pulses is maintained constant. In a further embodiment, the voltage delivered by the battery can be stabilized.

In the first embodiment, if the standard voltage $V_{S2}$, produced by the second circuit illustrated in FIG. 8, is increased in response to an increase in temperature, the standard voltage $V_{S2}$ will also be increased in response to a corresponding decrease in the supply voltage $V_{DD}$. Thus, the standard voltage circuit, illustrated in FIG. 8, in addition to effecting temperature compensation, also effects voltage compensation if the rate of change of the standard voltage $V_{S2}$ corresponding to changes in temperature and supply voltage is established to be a certain value. In the FIG. 11 embodiment, the value of $V_{OUT}$ is maintained constant if $V_{S1}$, illustrated in the first circuit in FIG. 8, is utilized. Specifically, in the first standard voltage circuit, depicted in FIG. 8, MOS transistors having different threshold voltage levels and the same conductivity characteristics are utilized in order to provide a standard voltage $V_{S1}$ that has no temperature characteristic. Thus, if this type of standard voltage circuit is utilized in the detecting circuit, illustrated in FIG. 11, the temperature characteristic can be maintained constant. Alternatively, when the standard voltage circuit does not vary in response to changes of voltage and, instead, is sensitive to changes in temperature, either the voltage or the temperature can be compensated. However, if it is necessary to compensate for both changes in temperature and voltage, the circuit utilized in FIG. 8 is preferred.

Among the changes in environmental conditions that effect the operation of liquid crystal display cells, aging, changes in temperature and changes in voltage are the most significant. It is noted, however, the the instant invention eliminates the need for external elements such as thermistors, and the like, to effect compensation for changes in temperature, voltage and aging. Thus, the instant invention utilizes the inherent characteristics of semiconductor materials such as channel mobility, threshold values, diffused resistance volume, Fermi potential difference and the like, each of which are stable elements, in order to compensate for changes in external environmental conditions that are uncontrollable. Use of these inherent characteristics of semiconductors permits the entire liquid crystal display driving circuit to be monolithically integrated into an IC without the use of any external elements.

As aforenoted, in the temperature sensing circuit depicted in FIG. 8, temperature compensation is obtained by comparing the shifts in threshold values between transistors 10 and 11 or between transistors 14 and 15. Moreover, it has been found that there is little difference in the shifting of threshold values of each of the circuits when same are batch processed utilizing stable dosages of ion implantations to establish the threshold value and, thus, as a practical matter, there is little fluctuation in the temperature compensating coefficient. Heretofore, when trimming was performed by external variable resistors, precise adjustment of the temperature compensating coefficient was obtainable. The instant invention uses non-volatile memory elements in the IC as a reasonable alternative for effecting such precise adjustment. A circuit, utilizing non-volatile memories for effecting precise adjustment of the temperature compensating coefficients of the standard voltage circuist, depicted in FIG. 8 and FIG. 11, is illustrated in FIG. 13.

Figure 13:
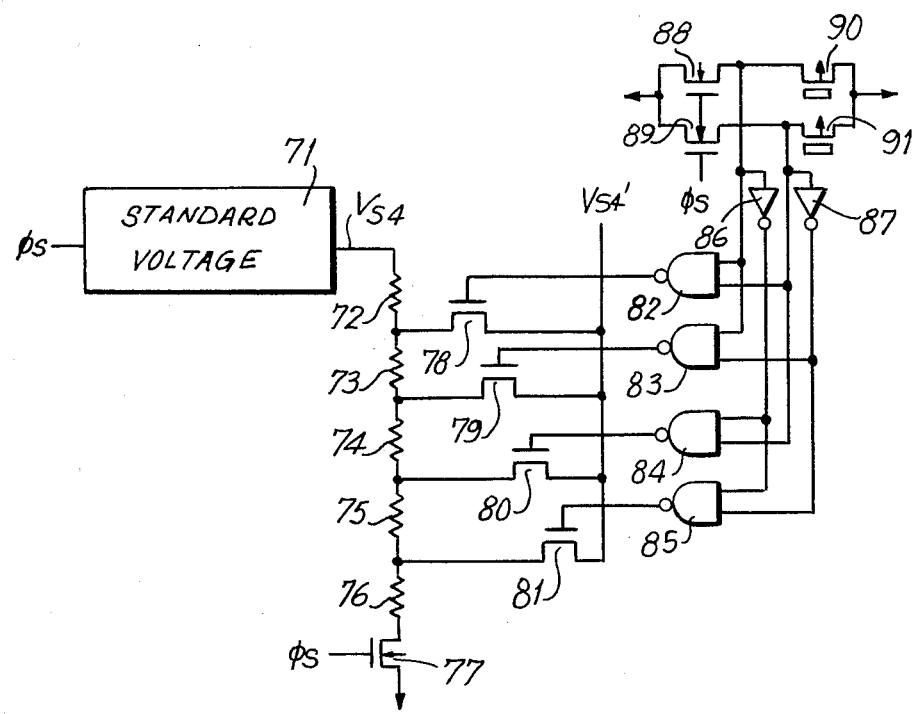
FIG. 13 is an example of a temperature coefficient adjustment circuit including non-volatile memories for use with the dynamic driving compensating circuits depicted in FIGS. 8 and 11.

Accordingly, referring to the circuit illustrated in FIG. 13, a standard voltage circuit 71 is adapted to receive a sampling pulse $\phi_s$ and, in response thereto, produce a standard voltage $V_{S4}$. The standard voltage $V_{S4}$ is divided by a resistive network comprising resistors 72 through 76 coupled in series with MOS sampling transistor 77. In response to the sampling pulse $\phi_s$ being applied to the standard voltage circuit 71 and the MOS transistor 77, the standard voltage $V_{S4}$ is divided by the resistive network, in accordance with the number of control transistors 78 through 81 that are selectively opened in a manner to be described below.

Non-volatile FAMOS (floating-avalanche injection MOS transistors) are utilized to determine which resistors in the resistive dividing networks 72 through 76 effect division of the standard voltage $V_{S1}$. The FAMOS elements are monolithically integrated into the same IC chip as the remaining elements and the temperature compensation information stored therein is based on testing of the electrical characteristics of the components, when manufactured, and, in particular, the temperature compensating coefficients of the transistors comprising the standard voltage circuit. Thus, once a specific value is selected for the resistive network, in response to each sample pulse applied to the voltage supply, and to the transistors 88 and 89 of the memory circuit, the NAND gates 82 through 85 receive from the FAMOS transistors 90 and 91, either directly or through inverters 86 and 87, signals which will selectively turn MOS transistors 78 through 81 ON or OFF, and thereby select the number of resistors that will divide the standard voltage $V_{S4}$.

It is noted that FAMOS non-volatile memory elements are not subject to other problems that occur in electronic devices such as diode breakdown, gate breakdown, overloading of the fuses, etc. Moreover, terminal selection at the time of external switch bonding and trimming by a LASER can also be utilized with such elements. Moreover, such non-volatile memory elements can be monolithically integrated with each of the other elements to thereby facilitate manufacture and improve reliability.

By providing compensation in the driving circuit, it is visibly located proximate to the liquid crystal display panel. Thus, as the compensation gets closer in proximity to the liquid crystal display panel better feedback is obtained. Therefore, the chip-on-panel (C.O.P.) method of forming the liquid crystal display panel, when the instant invention is incorporated therein, is most effective. Accordingly, the instant invention is characterized by the following advantages. First, only the effective value of the driving voltage is changed in response to a temperature change in the threshold value of the liquid crystal display segment. The power consumption is extremely reduced and precise compensation is, therefore, obtained. Secondly, since the effective voltage for driving the liquid crystal display cell is varied in response to changes in the supply voltage, stable energizing of the liquid crystal display cells is obtained over a wide range of supply voltages. Moreover, the liquid crystal display driving circuit arrangement disclosed herein for providing compensation in response to environmental changes such as temperature variations, voltage variations, etc., can be monolithically integrated into the same circuit chip as the remaining liquid crystal display driving circuitry, thereby eliminating external elements required to effect such adjustment. Finally, the liquid crystal display cells can be dynamically driven in a stable manner and permit ¼ and 1/6 dynamic driving and matrix driving methods to be utilized. As aforenoted, once dynamic driving can be utilized, the performance of the liquid crystal digitial display can be improved and the number of electrodes, utilized to form the liquid crystal display, can be sharply reduced, a benefit that is significant in a miniaturized electronic instrument such as an electronic wristwatch. These benefits further make it possible to incorporate character displays in small-sized electronic instruments such as an electronic wristwatch.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A liquid crystal display driving circuit comprising in combination a plurality of liquid crystal display cells having electrodes defining a plurality of display digits, said driving circuit including drive means for applying first drive signals and second drive signals to liquid crystal display cells for selectively effecting an effective voltage across said sensing means for detecting a change in condition, and in response thereto, for producing a sensing signal representative of the change in said condition, pulse width control means coupled to said sensing means for receiving said sensing signal and in response thereto applying a control signal having a pulse width representative of the change in condition sensed by said sensing means to said driving means, said driving means in response to said control signal being adapted to vary the pulse width of at least said first driving signal to an extent determined by the pulse width of said control signal applied thereto, each of said driving means, electronic sensing means and pulse width control means being comprised of a plurality of integrated circuit elements, the characteristics of said integrated circuit elements of said electronic sensing means being utilized to detect the change in condition and in response thereto produce said sensing signal.

2. A liquid crystal digital display driving circuit as claimed in claim 1, wherein said electronic sensing means is a temperature sensitive circuit, said temperature sensitive circuit being adapted to produce a sensing signal representative of changes in ambient temperature.

3. A liquid crystal digital display driving circuit as claimed in claim 2, wherein said temperature sensitive circuit includes a first standard voltage circuit for periodically producing a first standard voltage that is constant with respect to changes in temperature, a second standard voltage circuit for periodically producing a second standard voltage that varies in response to changes in temperature, and memory means for periodically receiving said first and second standard voltages and memorizing the variations therebetween, said memory means being adapted to produce sensing signals representative of the variations between said first standard voltage and second standard voltage periodically applied to said memory means.

4. A liquid crystal digital display driving circuit as claimed in claim 3, wherein said second standard voltage circuit includes a resistive voltage divider network disposed at the ouput thereof for dividing the second standard voltage periodically produced thereby, said memory means being adapted to selectively vary the voltage division effected by said voltage divider network to thereby permit said first standard voltage to be compared with said selectively divided second variable standard voltages so that the relationship therebetween can be stored in said memory.

5. A liquid crystal digital display driving circuit as claimed in claim 4, wherein said memory means incudes a comparator for comparing said first standard voltage produced by said first standard voltage circuit and said second divided standard voltage applied through said voltage divider network by said second standard voltage circuit, and in response to a change in the relationship therebetween, apply a reset signal to said memory means to thereby store therein the sensing signal to be produced thereby.

6. A liquid crystal digital display driving circuit as claimed in claim 5, wherein said memory means incudes shift register means coupled to said resistive network means for successively coupling additional resistors in said resistive network to the output of said second standard voltage circuit, until said comparator applies a reset signal thereto.

7. A liquid crystal digital display driving circuit as claimed in claim 3, wherein said first standard voltage circuit, second standard voltage circuit and said memory means are adapted to periodically receive a short sample pulse and in response to each sample pulse store a series signal representative of the change in temperature in said memory means until the next sample pulse is applied thereto.

8. A liquid crystal digital display driving circuit as claimed in claim 3, wherein said first and second standard voltage circuits include at least two like polarity transistors having different threshold values, the two like polarity transistors in said first standard voltage circuit having the same conductivity so that said standard voltage produced thereby does not vary in response to changes in temperature, and the two like polarity transistors in said second standard voltage circuit having different conductivity characteristics so that the output voltage thereof varies in response to changes in temperature.

9. A liquid crystal digital display driving circuit as claimed in claim 3, including an electronic temperature compensating coefficient adjustment circuit coupled to at least one of said first standard voltage circuit and said second standard voltage circuit, said temperature compensating coefficient circuit including a resistive network for dividing said standard voltage by a predetermined amount, and non-volatile semiconductor circuits coupled to said resistive network for selecting the elements of said resistive network to be utilized in dividing said standard voltage produced by said standard voltage circuit and thereby adjust temperature compensating coefficient of said standard voltage circuit.

10. A liquid crystal digital display driving circuit as claimed in claim 9, wherein said nonvolatile semiconductor circuit includes FAMOS nonvolatile memory elements for determining the amount of temperature compensating coefficient adjustment to be effected thereby.

11. A liquid crystal digital display driving circuit, as claimed in claim 1, wherein said electronic sensing means is integrated into the same circuit chip as said drive means.

12. A liquid crystal digital display driving circuit as claimed in claim 11, wherein said electronic sensing means is comprised of semiconductor elements that are monolithically integrated into the same circuit chip as said driving circuit.

13. A liquid crystal digital display driving circuit as claimed in claim 12, wherein said electronic sensing means is adapted to detect at least one of a change in temperature and supply voltage and in response thereto produce a sensing signal representative of the change sensed thereby.

14. A liquid crystal digital display driving circuit comprising in combination a plurality of liquid crystal display cells, said display cells including electrodes defining a plurality of display digits, said driving circuit including drive means for applying first drive signals and second drive signals to said liquid crystal display cell for selectively effecting effective voltages across said display cells for the purpose of energizing said display cell, and electronic temperature sensing means for detecting a change in temperature and, in response thereto, applying a sensing signal to said driving means said driving means in response to said sensing signal being adapted to vary the amplitude of at least said first drive signal and hence the effective voltage across said display cell, to an extent determined by said sensing signal produced by said temperature sensing means, said temperature sensing circuit including at least two like polarity MOS transistors, said transistors having different threshold values and distinct conductivity characteristics, to thereby produce an output voltage that is inversely varied in proportion to a change in ambient temperature.

* * * * *